(12) United States Patent
Knebel et al.

(10) Patent No.: US 10,288,860 B2
(45) Date of Patent: May 14, 2019

(54) METHOD AND DEVICE FOR ANALYSING AN OBJECT, IN PARTICULAR A MICROSCOPIC SAMPLE

(71) Applicant: LEICA MICROSYSTEMS CMS GMBH, Wetzlar (DE)

(72) Inventors: Werner Knebel, Kronau (DE); Frank Sieckmann, Eppingen (DE); Florian Fahrbach, Heidelberg (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 29 days.

(21) Appl. No.: 15/566,729

(22) PCT Filed: Apr. 18, 2016

(86) PCT No.: PCT/EP2016/058565
§ 371 (c)(1),
(2) Date: Jan. 30, 2018

(87) PCT Pub. No.: WO2016/166375
PCT Pub. Date: Oct. 20, 2016

(65) Prior Publication Data
US 2018/0180864 A1    Jun. 28, 2018

(30) Foreign Application Priority Data

Apr. 17, 2015 (LU) .......................................... 92696

(51) Int. Cl.
*H04N 15/00* (2006.01)
*H04N 9/47* (2006.01)
(Continued)

(52) U.S. Cl.
CPC ....... *G02B 21/006* (2013.01); *G02B 21/0032* (2013.01); *G02B 21/18* (2013.01); *G02B 21/248* (2013.01); *G02B 21/367* (2013.01)

(58) Field of Classification Search
CPC .... G02B 21/006; G02B 21/18; G02B 21/367; G02B 21/0032; G02B 21/248
(Continued)

(56) References Cited

U.S. PATENT DOCUMENTS

2004/0125228 A1    7/2004  Dougherty
2007/0263226 A1* 11/2007  Kurtz .................. A61B 5/0059
                                                              356/492

FOREIGN PATENT DOCUMENTS

DE       102010049751 A1    5/2012
WO     WO 2013053822 A1    4/2013

* cited by examiner

*Primary Examiner* — Robert Chevalier
(74) *Attorney, Agent, or Firm* — Leydig, Voit & Mayer, Ltd.

(57) ABSTRACT

A method for analyzing a microscopic sample with a microscope includes illuminating at least a sub-region of the microscopic sample by illumination light. Detection light emanating from the microscopic sample is guided on a detection beam path, which includes at least one focusing optical element and which has a plurality of detection beam path branches, each with at least one detector element. The detector elements are parts of the same surface detector. By art adjusting element in at least a first one of the detection beam path branches, an optical path length of the first detection beam path branch is adjusted in such a way that the portion of the detection light guided on the first detection beam path branch is focused on the detector element of the first detection beam path branch.

27 Claims, 11 Drawing Sheets

(51) Int. Cl.
*G02B 21/00* (2006.01)
*G02B 21/18* (2006.01)
*G02B 21/36* (2006.01)
*G02B 21/24* (2006.01)

(58) Field of Classification Search
USPC .................. 348/49, 50, 54, 61, 46, 51, 79
See application file for complete search history.

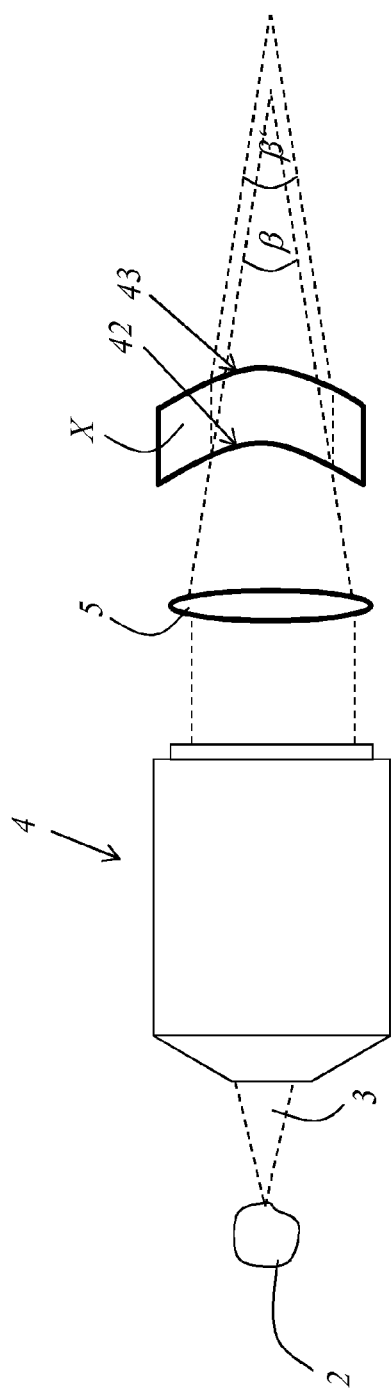

METHOD AND DEVICE FOR ANALYSING AN OBJECT, IN PARTICULAR A MICROSCOPIC SAMPLE

CROSS-REFERENCE TO PRIOR APPLICATIONS

This application is a U.S. National Stage Application under 35 U.S.C. § 371 of International Application No. PCT/EP2016/058565 filed on Apr. 18, 2016, and claims benefit to Luxembourgian Patent Application No. LU 92696 filed on Apr. 17, 2015. The International Application was published in German on Oct. 20, 2016 as WO 2016/166375 A1 under PCT Article 21(2).

FIELD

The invention relates to a method for analyzing an object, in particular a microscopic sample, in which at least one sub-region of the object is illuminated by illumination light and detection light emanating from the object is guided on a detection beam path, which contains at least one focusing optical element and which has a plurality of detection beam path branches each having at least one detector element.

The invention also relates to a device for executing such a method and to a device for the optical analysis of an object having a branched detection beam path, which has a detection lens and at least one focusing optical element, as well as a plurality of detection beam path branches each having at least one detector element.

BACKGROUND

In microscopy it is greatly advantageous, for example for analyzing fast physiological reactions, to detect from a sample plane the detection light of different wavelengths simultaneously using different surface detector elements. A three-chip color camera, for example, can be used for this. In the case of such a camera, the incident light is directed by means of a multipart prism of complex construction, which contains a plurality of color filters, to three sensors in a wavelength-specific manner. Each point of the object is simultaneously detected accurate to the pixel by the three sensors, so that from the data obtained, an RGB signal, for example, can be generated for each pixel. The accuracy of the adjustment and positioning of the individual components must be particularly good in this case.

SUMMARY

In an embodiment, the present invention provides a method for analyzing a microscopic sample with a microscope. At least a sub-region of the microscopic sample is illuminated by illumination light. Detection light emanating from the microscopic sample is guided on a detection beam path, which includes at least one focusing optical element and which has a plurality of detection beam path branches, each with at least one detector element. The detector elements are parts of the same surface detector. By an adjusting element in at least a first one of the detection beam path branches, an optical path length of the first detection beam path branch is adjusted in such a way that the portion of the detection light guided on the first detection beam path branch is focused on the detector element of the first detection beam path branch.

BRIEF DESCRIPTION OF THE DRAWINGS

The subject matter of the invention is shown by way of example and schematically in the drawings and described below with reference to the drawings, wherein identical elements or elements having the same effect are mostly provided with the same reference signs. In particular, the influence of the different refractive indices of the materials through which the beams of rays pass was not taken into account for the most part when drawing in the beams of rays for the sake of clarity. The convergence angle of the beams of rays drawn in is thus frequently represented as identical for various materials or optical components in the drawings for simplification. The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 8 schematically shows the operating principle when using curved interfaces;

DETAILED DESCRIPTION

Figure 1:
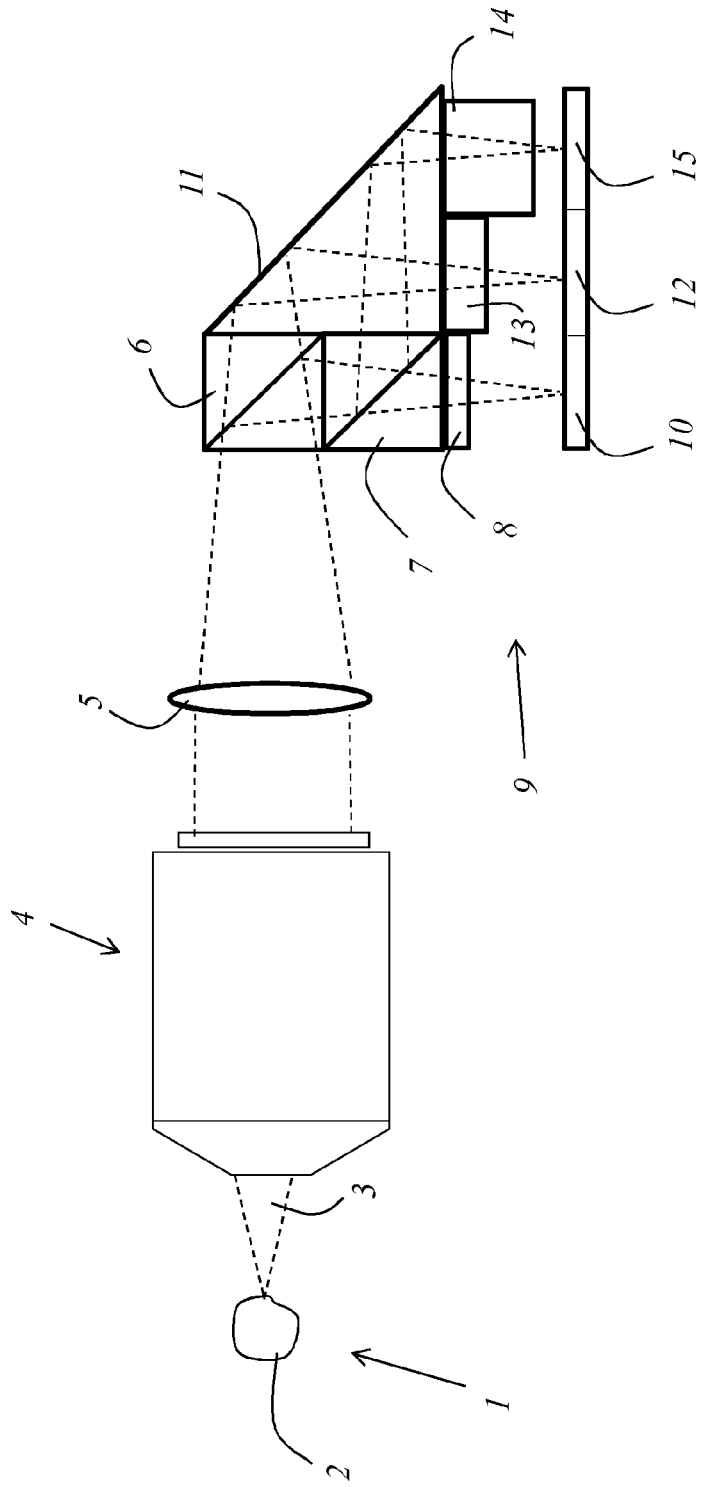
FIG. 1 shows a first embodiment of a device according to the invention with a branched detection beam path and surface detector elements, which are parts of the same surface detector.

An aspect of the present invention specifies a method for analyzing an object, in particular a microscopic sample, which method can be flexibly adjusted to the specific requirements in each case with regard to the imaging optical system used and/or the object to be analyzed.

This is achieved according to an embodiment by a method which provides that in at least one of the detection beam path branches an adjusting element is present, with which the optical path length of this detection beam path branch is adjusted so that the portion of the detection light guided on this detection beam path branch is focused on the detector element of this detection beam path branch.

Another aspect of the present invention specifies a device that can be flexibly adjusted to the specific requirements in each case with regard to the imaging optical system used and/or the object to be analyzed.

This is achieved according to an embodiment by a device of the type mentioned at the outset, which provides that in at least one of the detection beam path branches an adjusting element is present, with which the optical path length of this detection beam path branch is adjustable so that the portion of the detection light guided on this detection beam path branch is focused on the detector element of this detection beam path branch.

An embodiment of the invention has the very particular advantage that a longitudinal chromatic aberration, for example, of the at least one optical element focusing the detection light, which element can contain a lens, for example, in particular a microscope lens or camera lens and/or a tube optical system, can be corrected individually and in particular also automatically by means of the adjusting element.

In a particular embodiment, the detection light is distributed to different detection beam path branches as a function of at least one detection light property. The detection light property can comprise, for example, the spatial orientation of a linear polarization and/or the association with a predetermined or predeterminable wavelength range.

It is thus possible, for example, to direct the portion of the detection light having a wavelength under 560 nm to a first detection beam path branch, to direct the portion of the detection light that has a wavelength in the range between 560 nm and 640 nm to a second detection beam path branch and to direct the portion of the detection light having a wavelength over 640 nm to a third detection beam path branch. To split the detection light, color beam splitters are used for example, which can also be arranged in particular one after another in a cascaded manner. It goes without saying that the invention is not restricted to said wavelengths.

It is possible in this way to realize a color camera and/or a microscope arrangement, which can be adapted individually to the conditions present, in particular the optical properties of the optical elements upstream of the detection beam path branches and/or of the object, in particular in a wavelength-specific manner. In particular, the invention has the advantage that each detection beam path branch can be influenced in such a way that the detection light guided on it is focused exactly on its detector element, which will be described further below in detail.

A longitudinal chromatic aberration of the focusing optical element and/or a longitudinal chromatic aberration of an optical system upstream of the detection beam path can be corrected, in particular automatically, by the adjusting element or by a plurality of adjusting elements. For example, an automatic correction can take place by means of a control device, which detects a deviation from a target focusing, as in the case of an autofocus system.

Alternatively or in addition to a wavelength-specific distribution of the detection light to different detection beam path branches, it is provided in a particular embodiment that the detection light is distributed to different detection beam path branches and/or is focused on detector elements of different detection beam path branches as a function of the location of its origin and/or as a function of the axial distance of the location of its origin to a detection lens.

Such an embodiment has the very particular advantage that for example the detection light of different sample layers, for example of a microscopic sample, can be detected separately from one another, in particular simultaneously. It is made possible in this way to obtain image data of different sample layers, in particular simultaneously, which facilitates a rapid 3D reconstruction of the sample. It can also be provided here in addition that, with regard to a first sample layer, only the detection light of a first wavelength range is detected, while with regard to a second sample layer only the detection light of a second wavelength range, which is different from the first wavelength range, is detected. There is certainly no restriction here to only two sample layers and/or two wavelength ranges. On the contrary, the number of sample layers and/or the number of wavelength ranges can be even three or more.

In this regard it can be provided advantageously that multiple sample layers are illuminated simultaneously or sequentially and the detection light is distributed to different detection beam path branches and/or focused on detector elements of different detection beam path branches as a function of the sample layer from which it originates. This process has the particular advantage that due to the simultaneous illumination of multiple sample layers by a suitable illumination device, very quickly, simultaneously or sequentially, image data of these sample layers can be obtained, in particular without the sample having to be moved relative to the detection arrangement, which will be explained further below in detail. It is made possible in this way to record an image stack, which permits a three-dimensional reconstruction of the sample, quickly and gently with regard to the sample.

A more gentle analysis of a sample in three dimensions is facilitated in particular because the loading by the illumination light can be reduced on account of the faster image data acquisition and because, as explained in detail further below, the sample does not have to be moved relative to the detection arrangement.

The invention can advantageously have an application in SPIM microscopy in particular. The SPIM technique (single plane illumination microscopy), in which illumination of the sample is carried out in layers, permits an acquisition of image data that is faster and gentler on the sample than point-by-point scanning of a sample, for example. A known application of SPIM technology is the field of fluorescence microscopy, in which fluorophores in the sample are excited by laser light. In the known SPIM technology, an excitation takes place in this case in a layer of a sample illuminated by an illumination light sheet (also termed a "light strip"). To generate a SPIM image, the sample is illuminated by the sheet of light, while the observation of the sample layer illuminated in this way takes place in a vertical direction by detection of the fluorescent or scattered light.

In an application of the invention in SPIM microscopy, illumination of multiple sample layers can take place in a particularly advantageous manner using a single sheet of light having a spatial thickness which is greater than the depth of field of the detection arrangement, so that the detection light emanating from each of the sample layers illuminated simultaneously by one and the same sheet of light can be detected separately from one another, simultaneously or sequentially.

This process is not restricted solely to SPIM technology. On the contrary, an illumination device can generally be present, which illuminates multiple sample layers, wherein the detection light is distributed to different detection beam path branches and/or is focused on detector elements of different detection beam path branches as a function of the sample layer from which it originates.

As already mentioned, it can advantageously be provided here that the detection light emanating from the different sample layers is focused spatially separated on separate detector elements, in particular surface detector elements. Such an embodiment makes it possible in a particularly advantageous manner to be able to record image data simultaneously from a plurality of different sample layers.

The branching of the detection beam path can be achieved in particular with the aid of beam splitters, which can be formed, for example, as beam splitter cubes. In particular, the detection beam path can have at least one neutral beam splitter or a polarization beam splitter or a color beam splitter.

The adjusting device enables the optical path lengths of the detection beam path branches to be adapted sample-specifically in such a way that each detector element is located in an optically corresponding plane to the plane in which the object layer to be analyzed lies. Or expressed another way: the optical light paths of the detection beam path branches can be adjusted in such a way that each of the detector elements "watches" the object layer to be analyzed.

Such an adaptability of the optical path lengths has the particular advantage that the different formation and the different properties of different samples, especially with regard to extent and/or refractive index, can be taken into account. For example, it can be taken into account in particular also wavelength-specifically in relation to the optical path length whether the detection light has to cover a longer or a shorter path through the sample before it exits the sample. Moreover, an adaption of the optical path lengths can also be undertaken precisely, for example, when exchanging optical components in the detection beam path, such as when changing the detection lens system, for example.

In a particular embodiment of the method, the optical path lengths of the individual detection beam path branches are adjusted independently of one another by means of the adjusting element. For example, it can advantageously be provided that the optical path length of a first detection beam path branch and the optical path length of a second detection beam path branch are adjusted and/or can be adjusted independently of one another. It is made possible in particular in this way to associate a certain sample layer and/or detection light with certain properties individually with each detector element.

To this end in particular, each detection beam path branch can have its own adjusting element, with which its optical path length is adjusted and/or can be adjusted. In particular, it can be advantageously provided that, in each of the detection beam path branches, an adjusting element is respectively present with which the optical path length of the respective detection beam path branch is adjusted so that the portion of the detection light guided on this detection beam path branch is focused on the detector element of this detection beam path branch.

Alternatively or in addition, it is also possible that at least one adjusting element is present with which the optical path lengths of at least two detection beam path branches are changed and/or can be changed simultaneously. Such an adjusting element can be arranged, for example, in a region of the detection beam path in which two detection beam path branches overlap spatially.

Such an adjusting element can be realized in a completely different manner. In particular, it can also be provided that adjusting elements of a different type are arranged in different detection beam path branches.

For example, it can be provided that an adjusting element has a plurality of different, transparent optical components, such as a plurality of glass blocks of different lengths, for example, which are insertable in exchange for one another into the detection beam path or into a detection beam path branch. By exchanging such an optical component for a geometrically longer optical component or a component having a higher refractive index, an extension of the optical path length can be achieved, while by exchanging such an optical component for another optical component that is formed geometrically shorter and/or has a lower refractive index, a reduction in the optical path length of the detection beam path or the detection beam path branch can be achieved.

In this context, reference is to made to the fact that here and in the following the material glass (for example in "glass block") is only mentioned by way of example. In general, any materials and material combinations that have the required optical properties for realizing the invention can be used for the optical components of the adjusting device and also for all the other optical components used. In particular, large parts of the optical components used and shown in the drawings (including the optical components of the adjusting device) can even consist in part or entirely of air and/or other gases or gas mixtures or even of liquids (such as water, oil, for example). For example, the mirrors used can be manifested as reflection prisms or alternatively also only as a simple standalone mirror surface. The beam splitters used can be simple beam splitter plates or also beam splitter cubes, for example.

It can be provided in particular that the adjusting element has a plurality of transparent optical components, which are insertable independently of one another into the detection beam path and/or into a detection beam path branch. For example, it is possible to insert a plurality of optical components spatially one after another into the detection beam path or into one of the detection beam path branches, wherein an extension of the optical path length is achievable by adding another optical component, while a shortening of the optical path length can be effected by removing one of the optical components.

In a particularly advantageous embodiment, which permits a rapid adjustment of the respective optical path length and ensures that the optical components are always optimally adjusted, the adjusting element has a plurality of optical components arranged on a turret or on a displacement arrangement. This makes it possible, for example by simple rotation of the turret, to exchange one optical component in the respective detection beam path branch for another optical component. It is also possible to exchange the optical components of a plurality of detection beam path branches simultaneously by a single rotation process or by a single displacement process, which facilitates a rapid and efficient adaption of the optical path lengths of a plurality of detection beam path branches in one adjustment step.

Alternatively or in addition, it can be provided generally that the adjusting device or an adjusting element of the adjusting device has at least one transparent block, for example a glass block, which is arranged movably, in particular rotatably and/or displaceably, in such a way that the portion of the block located in the detection beam path and/or in a detection beam path branch is variable.

Alternatively or in addition, it can furthermore be provided quite generally that at least one of the detector elements is positioned along the optical axis standing perpendicular on the detector element independently of the other detector elements in such a way that the desired optical path length is achieved. In this case, the detector element could either be anchored fixedly (for example, in a focus position of the optical beam path) or otherwise be held movably in the sense that its position along the optical axis can be adjusted, for example by means of a mechanical, pneumatic or electrical drive, or by a drive based on the piezoelectric effect, in order to reach a certain position on the optical axis. This drive can be part of the adjusting device. Such an adjustment could be carried out automatically or even manually before, between or also during individual measurements or image recordings.

In a particularly advantageous embodiment, which also permits in particular a continuous adjustment of the optical path length of the detection beam path branch or of a plurality of detection beam path branches, the adjusting element has at least one optical component that is adjustable in its geometrical and/or optical thickness.

For example, the adjusting element can have at least one optical component that is variable in its shape. This adjustable optical component can be realized in particular in that it has a fluid, in particular a liquid, arranged in a container, wherein the shape of the container is variable. In this way, the geometrical length of the part of the optical component through which the detection light radiates can be changed. This can be achieved, for example, by directly changing the shape of the vessel. However, it is also possible to change the shape of the optical component by exerting a pressure on the fluid or by generating a vacuum.

For example, the adjustable optical component can have two transparent limiting discs, between which a fluid, in particular liquid, optical medium is arranged. By varying the spacing of the limiting discs, the geometrical thickness and thus also the optical thickness of the adjustable optical component can be varied. The transparent limiting discs can, for example, form a receiving space for the optical medium together with a flexible resilient, in particular annular film, for example. The limiting discs can be pressed apart by pressurizing the fluid and thus the optical path length can be increased. By reducing the pressure acting on the fluid, the limiting discs can be moved towards one another and a reduction in the optical path length can be achieved thereby.

To avoid disruptive multiple reflections between the interfaces of the beam splitters and/or the optical components, it can advantageously be provided that at least one of the interfaces, in particular the all interfaces located in the detection beam path, is arranged at an angle different from 90 degrees to the incident direction of the detection light and/or that at least one of the interfaces, in particular all the interfaces located in the detection beam path, are arranged at an angle different from 90 degrees to the optical axis.

Filters, for example bandpass filters, can advantageously be applied to, in particular sputtered onto, the interfaces of the beam splitters and/or the optical components. This is to realize wavelength-specific detection, for example, and/or to block out light of the excitation wavelength.

In a particularly advantageous embodiment, at least one of the beam splitters and/or at least one of the optical components is configured so that aberrations are avoided or at least reduced and/or aberrations are at least compensated for.

To this end, at least one of the beam splitters and/or at least one of the optical components can have at least one curved interface, in particular an aspherically curved interface. Alternatively or in addition, it is also possible, for example, that at least one of the beam splitters or one of the optical components has an inhomogeneous refractive index across its cross section and thus develops a lens effect (GRIN lens). Alternatively or in addition, it is also possible for said purpose that at least one of the beam splitters and/or at least one of the optical components has a diffractive structure.

The effective refractive power of the beam splitters and/or of the optical components can amount to zero in a manner that is simple to realize, which as much as signifies that the focal length of these elements lies in infinity. An effective refractive power of zero ultimately also means that the convergence angle of the detection light beam focused in each case on a surface detector element through the respective beam splitter and the respective optical component is not changed. In the simplest case, an effective refractive power of the element of zero is achieved in elements consisting of a single material in that the front and the rear interface are flat.

However, it is advantageously also possible to use a beam splitter and/or an optical component having curved interfaces, wherein a refractive power of zero can nevertheless be achieved in that the curvature of its front interface and of its rear interface are identical. It is also possible in this regard to achieve an axial offset of the focus of the detection light with such a beam splitter and/or such an optical component; this is without the convergence angle of the respective detection light beam focused on a surface detector element changing, unlike the case of a lens.

The interfaces of identical curvature do not necessarily have to be the interfaces of the same beam splitter and/or optical component to achieve the described effect. On the contrary, it can also be provided advantageously that the first interface of the first beam splitter, for example, which the detection light encounters and the last interface for the individual detection beam path branches respectively are correspondingly identically curved. For the case that the refractive indices of said elements are different, however, at least one radius of curvature must be adapted accordingly to achieve the same effect.

Even in the case of an adjustable optical component, a particular additional axial offset of the focus of the detection light can be achieved. This is possible here too without the convergence angle of the respective detection light beam focused on a surface detector element changing, unlike the case of a lens.

For example, the adjustable optical component can have two transparent, curved limiting discs, between which a fluid, in particular a liquid, optical medium is arranged. By varying the spacing of the limiting discs, the geometrical thickness and thus also the optical thickness of the adjustable optical component can be varied. The transparent, curved limiting discs can, for example, form a receiving space for the optical medium together with a flexible resilient, in particular tubular, film. The limiting discs can be pressed apart by pressurizing the medium and thus the optical path length can be increased. By reducing the pressure acting on the medium, the limiting discs can be moved towards one another and a reduction in the optical path length can be achieved thereby. The two limiting discs are preferably curved in the same direction and have the same radius of curvature. Moreover, regardless of the curvature of the limiting discs, it can advantageously be provided that the refractive index of the fluid medium is adapted to the refractive index of the limiting discs. In particular, it can be provided that the refractive index of the medium is the same as that of the limiting discs.

The invention has the particular advantage that each detector element can be positioned in a plane corresponding optically to the object plane of interest without having to move the object and/or the detector element. This is particularly advantageous if the object cannot be moved or movement of the object poses a problem. This can be the case, for example, in microscopic analyses, in which instruments, such as microelectrodes or microneedles, for example, protrude into the sample during the analysis. In such a case in particular, it is also possible to keep the sample stationary and to use the adjusting element or the adjusting elements to adapt the optical path lengths of the individual detection beam path branches in such a way that a specific, for example wavelength-specific, focusing onto the detector elements, which can be formed in particular as surface detector elements, is ensured.

In a particularly advantageous embodiment, the geometrical path length of at least one detection beam path branch, in particular of all the detection beam path branches, remains constant during the adjustment of the optical path length of at least one detection beam path branch. The particular advantage of such an embodiment lies in the fact that neither the object, nor the optical system upstream of the detection beam path and/or the focusing optical system, such as a lens, for example, or a microscope lens, nor the detector elements have to be moved in order to adapt the device to the specific conditions in each case.

Moreover, keeping the geometrical path length constant, while only the optical path length is changed, has the particular advantage that a very much higher precision is achievable in respect of the adjustment, because an exact positioning of the individual elements by an adjusting process, in which for example the detector elements, or movable mirrors, for example, are moved, is not corrupted. On the contrary, positioning processes of this kind are largely unnecessary. Insofar as positioning processes are necessary in relation to a component that is adjustable in optical thickness, such as the optical components described above by way of example, this is unproblematic with regard to the effects on the beam path or at least is substantially less problematic than adjusting the positions of the detector elements, for example.

As already mentioned, the detector elements can be formed in particular as surface detector elements. For example, a detector element can be formed as a CCD detector or as a CMOS detector or as a sCMOS detector.

In one embodiment which manages with particularly few detector components, the detector elements are parts of the same detector, in particular surface detector. It can be provided in particular in this case that the detector has a sensor surface, wherein different spatial portions of the sensor surface form the different detector elements.

Alternatively, it is also possible that the detector elements are separate detectors, in particular surface detectors, or are at least parts of detectors, in particular surface detectors, which are separate from one another. Such an embodiment has the advantage that the individual detector elements can be operated and read completely independently of one another.

The method according to the invention can be implemented in particular using a scanning microscope and/or a confocal scanning microscope. By analogy, the device according to the invention can advantageously include a scanning microscope or a confocal scanning microscope and/or be formed from a scanning microscope and/or a confocal scanning microscope. In this case, the beam deflection device (scanner) in particular of a scanning microscope or confocal scanning microscope, which device is adjustable in respect of the deflection angle, can be used to generate a quasi light sheet for the SPIM illumination of one or more sample layers. The device according to the invention can also be formed as a camera and/or as a color camera, for example.

FIG. 1 schematically shows a first embodiment of a device according to the invention and illustrates an embodiment of a method according to the invention by way of example for a microscopic application, in which a microscopic sample 2 is analyzed as object 1. However, the present invention is not restricted to microscopic samples.

The device has a light source and can be formed, for example, as a laser. For a SPIM analysis, for example, the light source could be a light beam, which is formed with the aid of a cylindrical optical system into a sheet of light and focused using an illumination lens onto the sample 2. Alternatively, it would also be possible, for example, to illuminate the sample in reflected light.

The detection light 3 emanating from the sample 2 is collimated by the detection lens 4 and focused by a tube lens 5 and then passes to a first beam splitter 6. The first beam splitter 6 reflects the portion of the detection light 3 that has a wavelength below 640 nm. The remaining portion of the detection light 3 is transmitted.

The reflected portion of the detection light 3 passes to a further beam splitter 7, which reflects the portion of the detection light 3 that has a wavelength below 560 nm. The remaining portion of the detection light 3, thus the portion of the detection light 3 that has a wavelength in the range between 640 and 560 nm, is transmitted.

After passing a first optical component 8, which is part of an adjusting device 9 having a plurality of adjusting elements for adjusting the optical path lengths of the detection beam path branches, the portion of the detection light 3 reflected by the first beam splitter 6 and transmitted by the second beam splitter 7 reaches a first detector element 10. The optical path length of this detection beam path branch, at the end of which the first detector element 10 is located, is adjusted so that the first detector element 10 is located in a plane corresponding optically to the layer of the sample 2 to be analyzed.

The portion of the detection light 3 transmitted by the first beam splitter 6 reaches a mirror 11 and is deflected by this to a second detector element 12, which the portion of the detection light 3 transmitted by the first beam splitter 6 reaches after passing a second optical component 13, which is likewise part of the adjusting device 9. The second detector element 12 is likewise arranged in a plane corresponding optically to the layer of the sample 2 to be analyzed.

The portion of the detection light 3 reflected by the second beam splitter 7 likewise encounters the mirror 11 and is deflected by this to a third detector element 15, which is reached after passing through a third optical component 14. The third detector element 15 is likewise located in a plane corresponding optically to the layer of the sample 2 to be analyzed.

The device has the particular advantage that image data of different wavelength ranges of the layer of the sample 2 to be analyzed can be recorded simultaneously. Here the first detector element 10 receives the portion of the detection light 3 that has a wavelength below 560 nm, while the second detector element 12 receives the portion of the detection light 3 that has a wavelength above 640 nm. The portion of the detection light 3 in the wavelength range from 560 nm to 640 nm lying in between is detected by the third detector element 15. To prevent excitation light from getting to the detector elements 10, 12, 15, a notch filter is used, which filters out light having the excitation wavelength from the detection light 3.

The optical path lengths of the detection beam path branches can be changed by exchanging the optical components 8, 13, 14. To this end a turret or a displacement arrangement, for example, having a multiplicity of optical components of different lengths can be present for each of the detection beam path branches, so that to adapt the respective optical path length only the optical component immediately required can be transferred, guided in a mechanically precise manner, to the respective detection beam path branch. This process can also take place in particular under automatic control.

Figure 2:
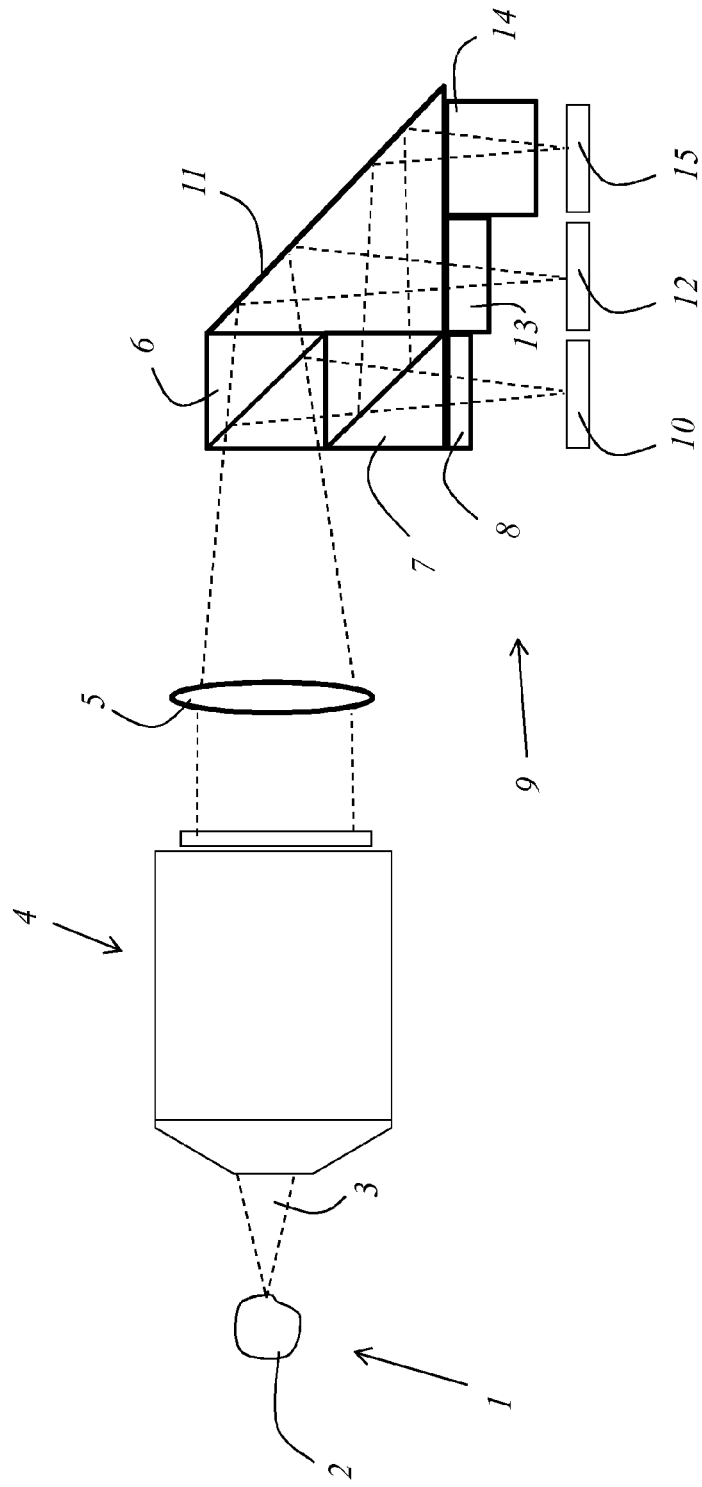
FIG. 2 shows a second embodiment of a device according to the invention.

FIG. 2 shows a second embodiment of a device according to the invention, which is constructed in a similar manner to the device shown in FIG. 1.

In this embodiment, the first detector element 10 and the second detector element 12 and the third detector element 15 are not constituents of the same surface detector, but are formed as separate surface detectors respectively, which are operated separately from one another.

Figure 3:
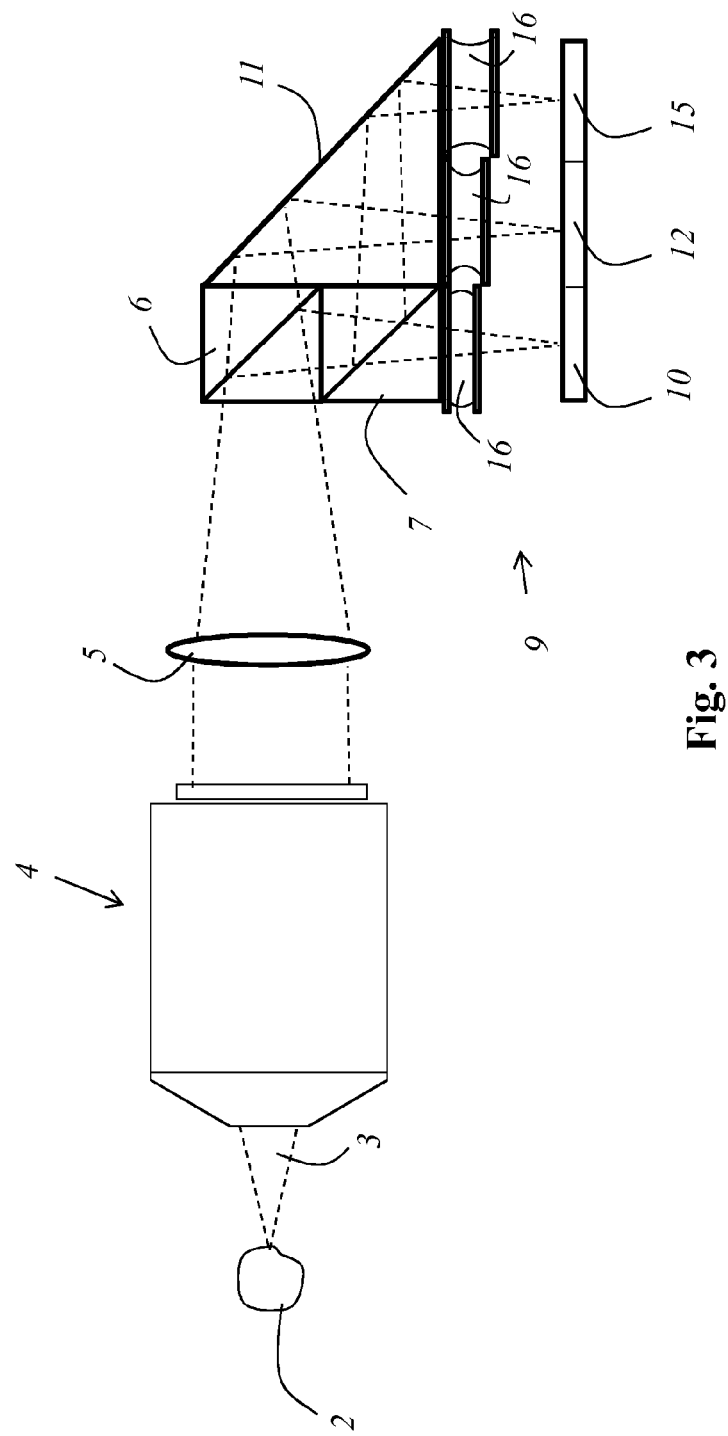
FIG. 3 shows a third embodiment of a device according to the invention having infinitely adjustable adjusting elements.

FIG. 3 shows a third embodiment of a device according to the invention, which is constructed in a similar manner to the device shown in FIG. 1.

However, an infinitely adjustable optical component 16 is arranged in each of the detection beam path branches. The infinitely adjustable optical components 16 can be adjusted independently of one another, so that the optical path lengths of the individual detection beam path branches can also be adjusted independently of one another.

Figure 4B:
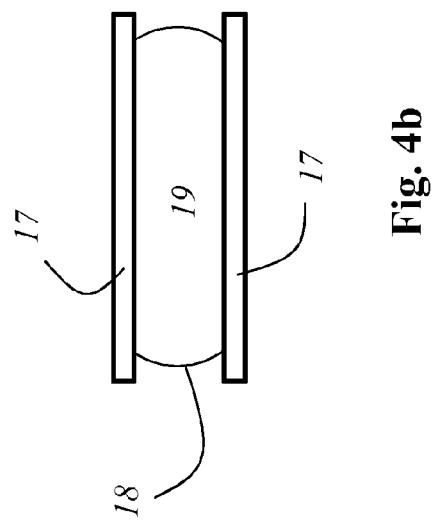
FIGS. 4a and 4b show the mode of operation of the infinitely adjustable adjusting elements.
Figure 4A:
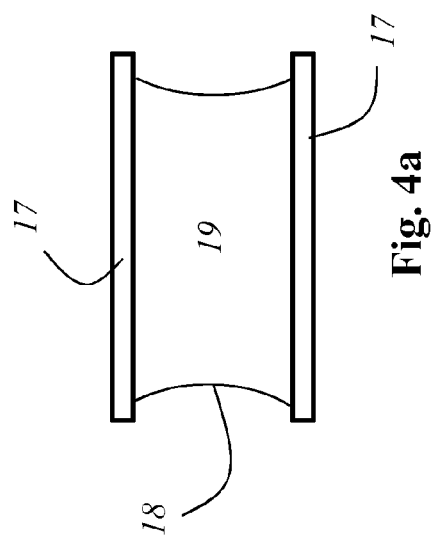

The mode of operation of the infinitely adjustable optical components 16 is shown in greater detail in FIGS. 4a and 4b. Each of the infinitely adjustable optical components 16 has two transparent limiting discs 17, which together with an annular, resilient film 18 form a receiving space for a fluid 19. The spacing of the transparent limiting discs 17—and thus the optical length irradiated—can be varied, for example by varying the pressure on the fluid 19. It is also possible alternatively or in addition to adjust the spacing of the transparent limiting discs 17 directly, for example by means of a servomotor.

Figure 5:
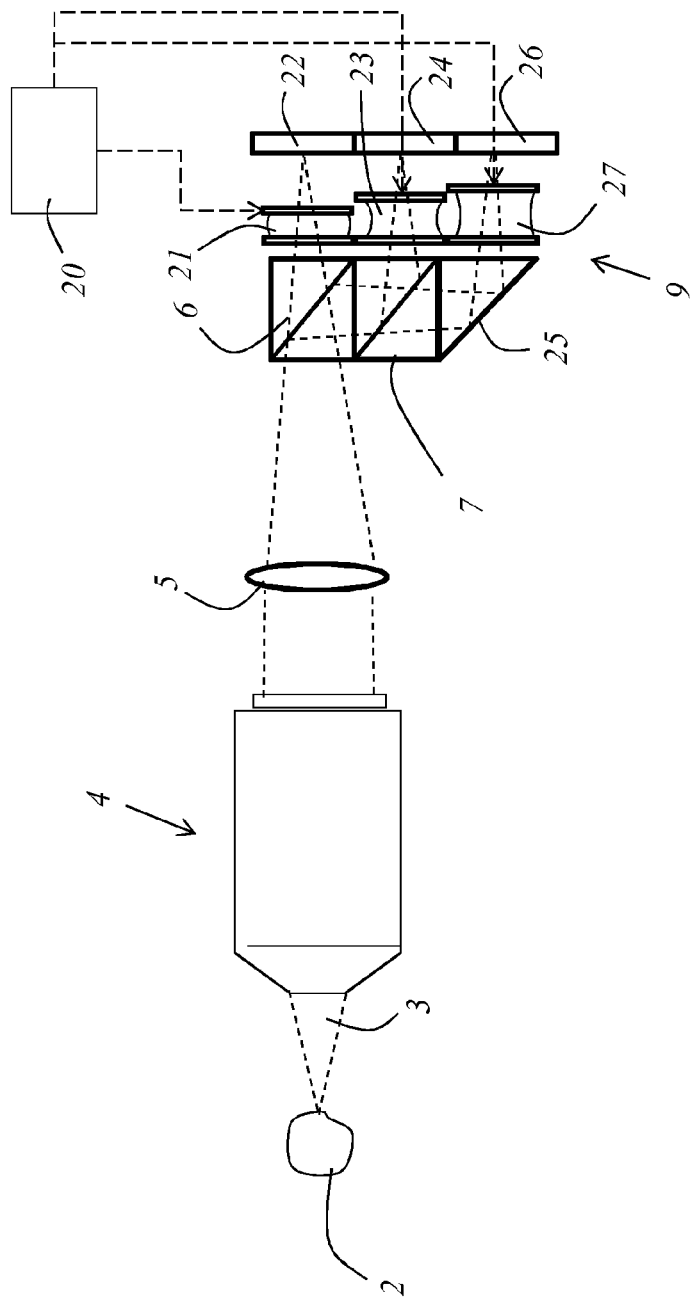
FIG. 5 shows a fourth embodiment of a device according to the invention having infinitely adjustable adjusting elements.

FIG. 5 schematically shows a fourth embodiment of a device according to the invention, in which the detection light 3 focused by the tube lens 5 is split by a first beam splitter 6. The first beam splitter 6 reflects the portion of the detection light 3 that has a wavelength below 640 nm. The remaining portion of the detection light 3 is transmitted and, after passing a first infinitely adjustable optical component 21, reaches a first detector element 22.

The portion of the detection light 3 reflected by the first beam splitter 6 reaches a second beam splitter 7, which reflects the portion of the detection light 3 that has a wavelength below 560 nm. After passing a second infinitely adjustable optical component 23, this portion of the detection light 3 reaches a second detector element 24.

The remaining portion of the detection light 3, thus the portion of the detection light 3 that has a wavelength in the range between 640 and 560 nm, is transmitted by the second beam splitter 7 and is then deflected by a deflection prism 25 to a third detector element 26, which the detection light 3 reaches after passing a third adjustable optical component 27.

In the case of this device also, the detector elements 22, 24, 26 are located in planes that corresponding optically to the layer of the sample 2 to be analyzed. The adjustable optical components 21, 23, 27 correspond in their structure to the adjustable optical component that is shown in FIG. 4. It can be advantageously provided that the adjustable optical components 21, 23, 27 are adjusted automatically by a control device 20.

Figure 6:
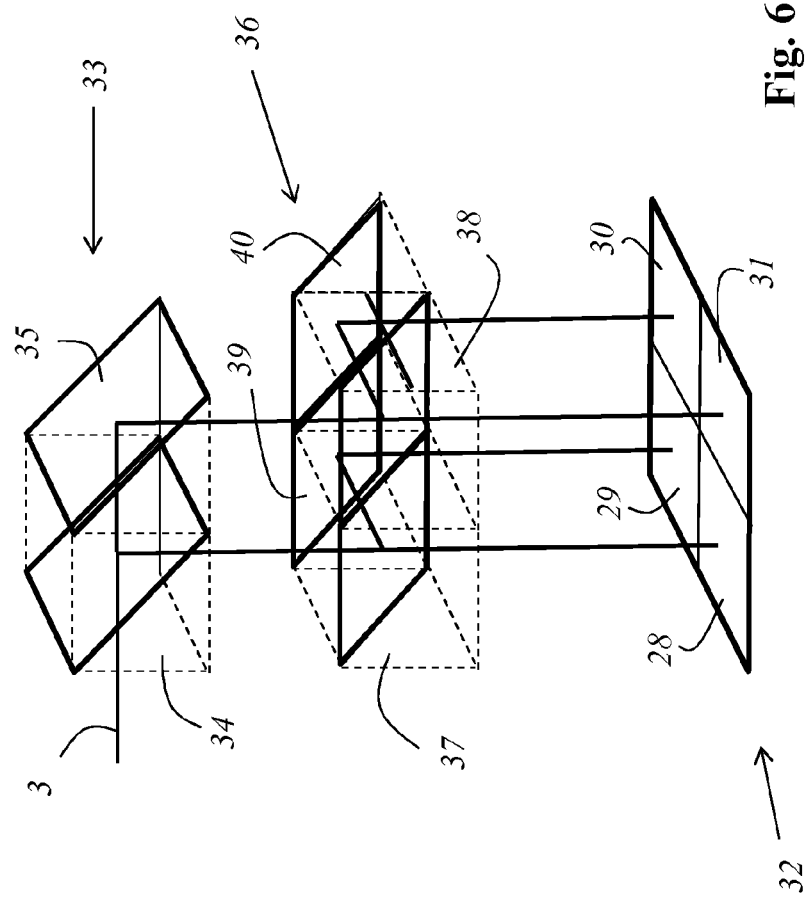
FIG. 6 shows an embodiment of a multidimensionally branched detection beam path.

FIG. 6 shows an embodiment of a multidimensionally branched detection beam path, in which a plurality of surface detector elements 28, 29, 30, 31 of a surface detector 32 are used and are each arranged by suitable, in particular automatic, adjustment by adjusting elements arranged in the detection beam path branches in a plane corresponding optically to a sample layer to be analyzed.

The multidimensional branching is achieved in that the detection light 3 is initially split spatially in a first splitter stage 33 by a first beam splitter 34, which can contain a color beam splitter, for example, wherein the transmitted portion of the detection light 3 is deflected by a first deflection mirror 35.

A further splitting then takes place in a second splitter stage 36 of both the transmitted portion of the detection light 3 and of the reflected portion, wherein the second beam splitters 37, 38, which can likewise contain color beam splitters, for example, and the second deflection mirrors 39, 40 of the second splitter stage 36 are oriented rotated by 90 degrees with regard to the respective optical axis and relative to the first beam splitter 34 and the first deflection mirror 35.

The embodiments that are shown in FIG. 1 to 11b have interfaces that are aligned perpendicular to the incidence direction of the incident light and/or are plane-parallel to one another. However, this does not have to be realized in this manner.

For example, to avoid disruptive multiple reflections between the interfaces of the beam splitters 6, 7, 34, 37, 38 and/or the optical components 8, 13, 14, 16, 21, 23, 27, it can be advantageously provided that at least one of the interfaces is arranged at an angle different from 90 degrees to the incidence direction of the detection light and/or that at least one of the interfaces, in particular all the interfaces located in the detection beam path, are arranged at an angle different from 90 degrees to the optical axis. Alternatively or in addition, it can be advantageously provided in particular that along the detection beam path at least interfaces directly following one another are not aligned parallel to one another.

Figure 7:
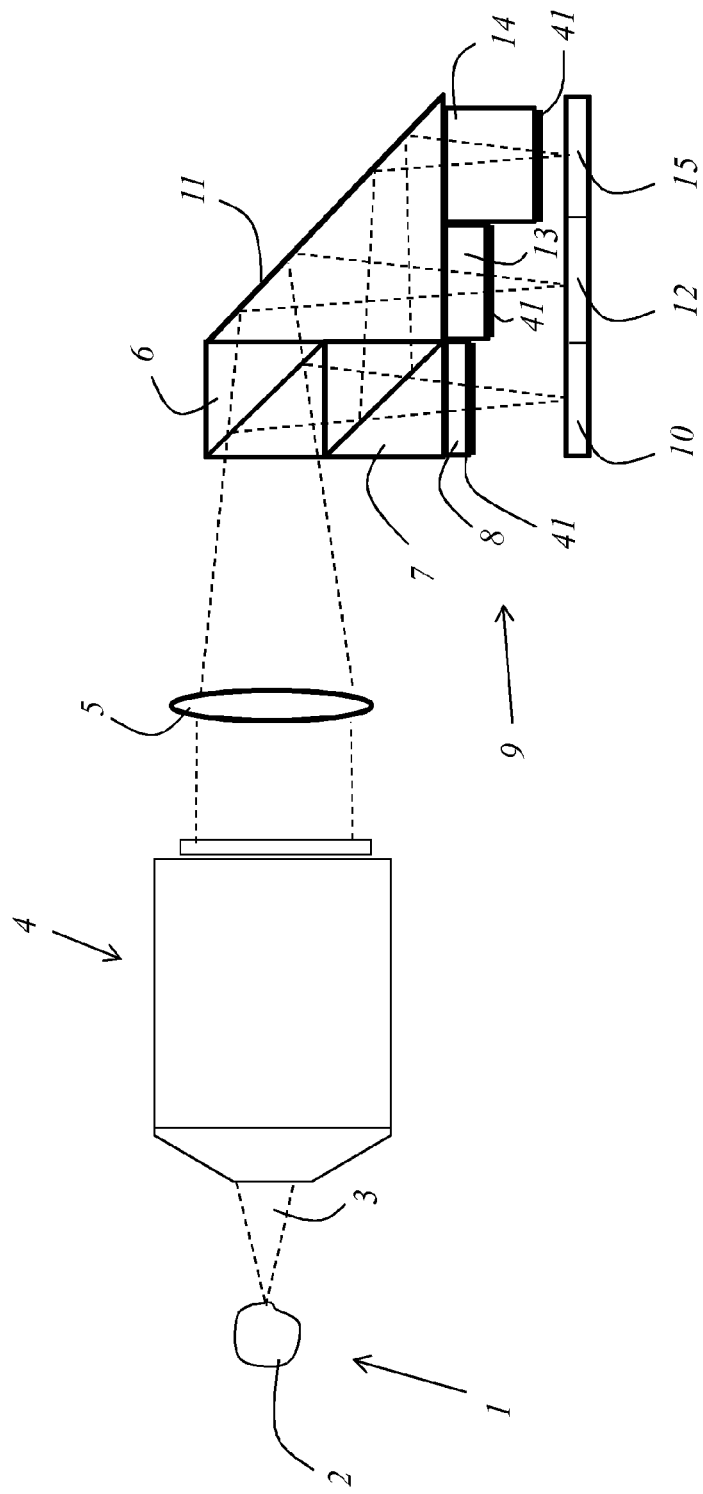
FIG. 7 shows a fifth embodiment of a device according to the invention having bandpass filters.

Furthermore, a filter, in particular a bandpass filter, can be applied to, in particular sputtered onto, at least one of the interfaces. FIG. 7 shows an embodiment that corresponds substantially to the embodiment according to FIG. 2, wherein, however, a bandpass filter 41 is applied by way of example to the first optical component 8, the second optical component 13 and the third optical component 14. These bandpass filters 41 can be used for wavelength-specific detection, for example, and in particular for suppressing the light of an excitation wavelength.

The bandpass filters 41 can be formed in the same manner. However, it is also possible that the bandpass filters 41 are formed differently in respect of the wavelength range of the transmitted light, in order to be able to detect detection light of different wavelength ranges with the surface detector elements 10, 12, 15, for example. It is also possible to apply the bandpass filters 41 to the respective other interface of the first optical component 8, the second optical component 13 and the third optical component 14. Alternatively, the bandpass filters 41 could also be arranged in another location on one of the beam splitters 6, 7, 34, 37, 38 and/or one of the optical components 8, 13, 14, 16, 21, 23, 27 in the non-overlapping parts of the detection beam path branches.

It should be pointed out, moreover, that the beam splitters 6, 7, 34, 37, 38 and/or the optical components 8, 13, 14, 16, 21, 23, 27 do not have to be manufactured from the same material, but can be. In particular, even different materials can be used advantageously. Even if adjoining elements are manufactured from the same material, these elements do not necessarily have to be manufactured together in one piece. However, this is entirely possible and particularly advantageous in some applications.

In a particularly advantageous manner, at least one of the beam splitters 6, 7, 34, 37, 38 and/or at least one of the optical components 8, 13, 14, 16, 21, 23, 27 can be configured so that aberrations are avoided or at least reduced, and/or compensated for. To this end, at least one of the beam splitters 6, 7, 34, 37, 38 and/or at least one of the optical components 8, 13, 14, 16, 21, 23, 27 can have at least one curved interface, for example, in particular an aspherically curved interface. Alternatively or in addition, it is also possible, for example, that at least one of the beam splitters 6, 7, 34, 37, 38 and/or at least one optical component 8, 13, 14, 16, 21, 23, 27 has an inhomogeneous refractive index across its cross section and thus develops a lens effect (GRIN lens).

Alternatively or in addition, it is also possible for said purpose that at least one of the beam splitters 6, 7, 34, 37, 38 and/or at least one of the optical components 8, 13, 14, 16, 21, 23, 27 has a diffractive structure.

The embodiments shown in the FIG. 1 to 7 have beam splitters 6, 7, 34, 37, 38 and optical components 8, 13, 14, 16, 21, 23, 27, the effective refractive power of which is equal to zero; or expressed another way, the focal length of these elements lies in infinity. An effective refractive power of zero ultimately means that the convergence angle β of the respective detection light beam focused on a surface detector element through the respective beam splitter 6, 7, 34, 37, 38 and the respective optical component 8, 13, 14, 16, 21, 23, 27 is not changed. In the simplest case, an effective refractive power of the element of zero in the case of elements consisting of a single material is achieved in that the front and rear interfaces are flat.

However, it is advantageously also possible to use a beam splitter 6, 7, 34, 37, 38 and/or an optical component 8, 13, 14, 16, 21, 23, 27 (generally symbolized in FIG. 8 by the optical system X), the interfaces of which are curved, wherein nevertheless a refractive power of zero can be achieved in that the curvatures of the front interface 42 and the rear interface 43 are the same, as shown schematically and by way of example in FIG. 8. In this regard, it is also possible using such a beam splitter 6, 7, 34, 37, 38 and/or an optical component 8, 13, 14, 16, 21, 23, 27 to achieve an axial offset of the focus of the detection light 3, as shown schematically in FIG. 8. This is without—differently than in the case of a lens—the convergence angle β of the respective detection light beam focused on a surface detector element changing. Consequently the following applies: β=β'.

To achieve the effect described, the interfaces of identical curvature do not necessarily have to be the interfaces of the same beam splitter 6, 7, 34, 37, 38 and/or optical component 8, 13, 14, 16, 21, 23, 27. On the contrary, it can advantageously also be provided that the first interface 44 of the first beam splitter 6, for example, which the detection light 3 encounters, and the last interface 45, 46, 47 respectively for the individual detection beam path branches are correspondingly identically curved (provided that they have the same refractive index).

Figure 9:
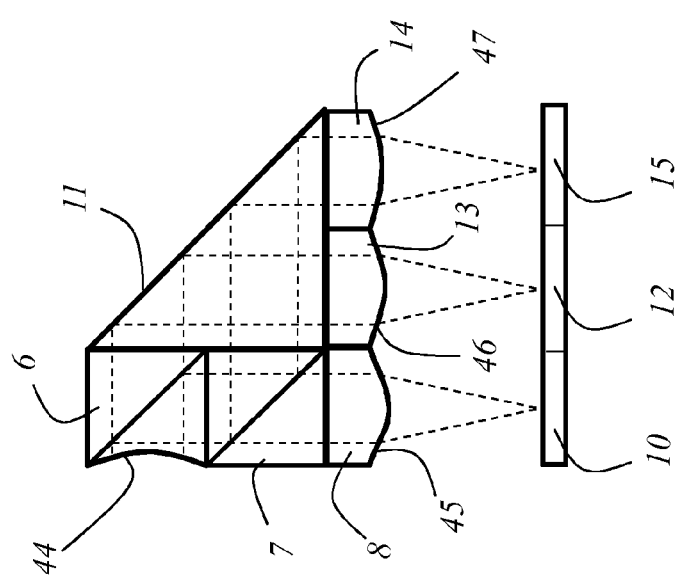
FIG. 9 is a detailed view of a sixth embodiment, with curved interfaces.
Figure 11B:
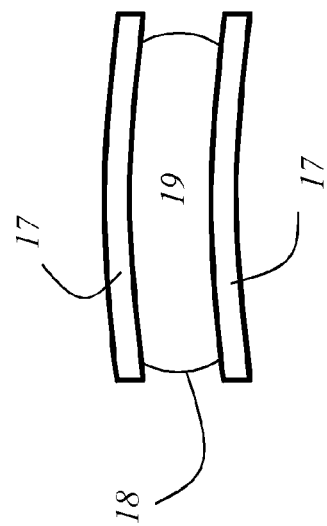
FIGS. 11a and 11b show an embodiment of an adjustable optical component with curved interfaces.
Figure 11A:
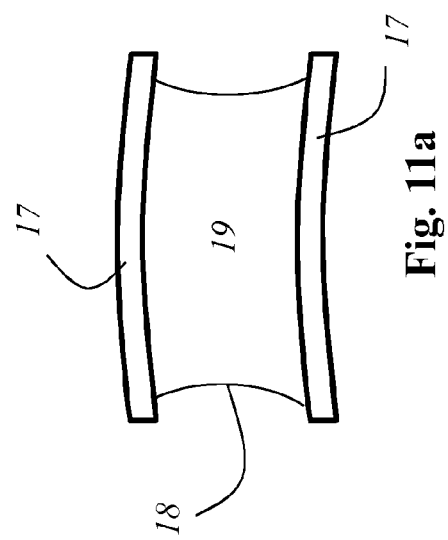

FIG. 9 is a detailed view of an embodiment, in which the first interface 44 of the first beam splitter 6, which the detection light 3 encounters, is curved in a convex manner, while the last interface 45, 46, 47 respectively for the individual detection beam path branches is curved in a concave manner. The embodiment otherwise corresponds substantially to the embodiment shown in FIG. 1, wherein, however, the optical components 8, 13, 14 have identical lengths (which can be indefinitely small). Here the curvatures of the various interfaces can be pronounced to a varying degree, to compensate for aberrations, for example, but also to image various sample layers simultaneously or sequentially onto the various detector elements, wherein the detection light 3 is distributed to different detection beam path branches and focused on the detector elements 10, 12, 15 of different detection beam path branches as a function of the sample layer from which it originates.

Figure 10:
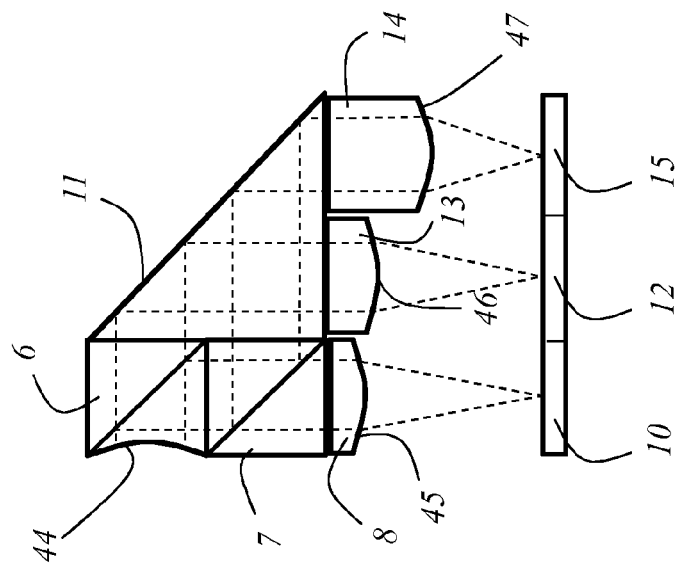
FIG. 10 is a detailed view of a further, seventh embodiment, likewise with curved interfaces.

FIG. 10 likewise shows a detailed view of an embodiment, in which the first interface 44 of the first beam splitter 6 that the detection light 3 encounters is curved in a convex manner, while the last respective interface 45, 46, 47 for the individual detection beam path branches is curved in a concave manner. As in FIG. 9, the curvatures of the various interfaces can be pronounced to a varying degree. In contrast to FIG. 9, the optical components 8, 13, 14 have different lengths here. Aberrations can be balanced out or multiple sample layers can be illuminated simultaneously or sequentially by this construction also, wherein the detection light 3 is distributed to different detection beam path branches and is focused on the detector elements 10, 12, 15 of different detection beam path branches as a function of the sample layer from which it originates.

A particular additional axial offset of the focus of the detection light 3 can be achieved even in the case of an adjustable optical component. This is also without differently than in the case of a lens the convergence angle β of the respective detection light beam focused on a surface detector element changing. The embodiment shown in FIGS. 11a and 11b substantially corresponds to the embodiment shown in FIGS. 4a and 4b, wherein however the limiting discs 17 are not executed flat for said purpose, but are curved (both with the same radius of curvature).

Figure 12B:
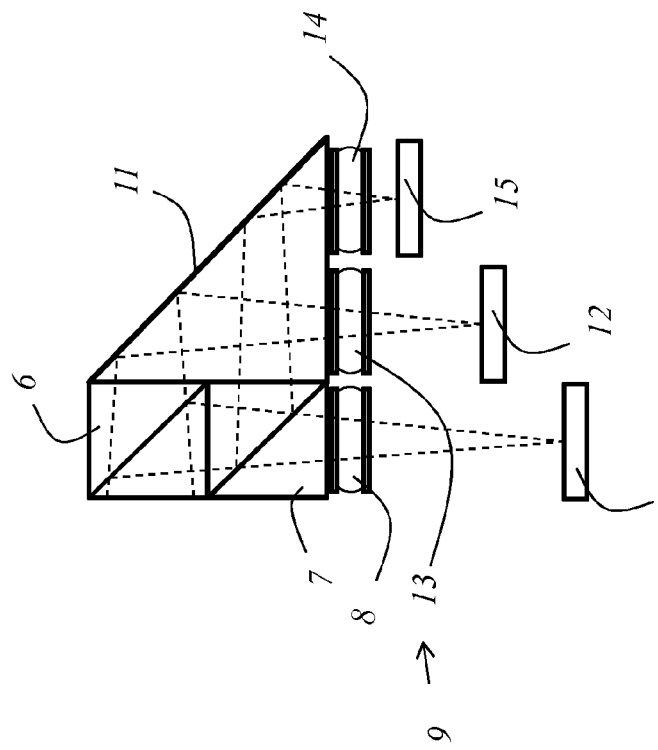
FIGS. 12a and 12b show an eighth embodiment of a device according to the invention with direct placing of the detectors in the focus planes.
Figure 12A:
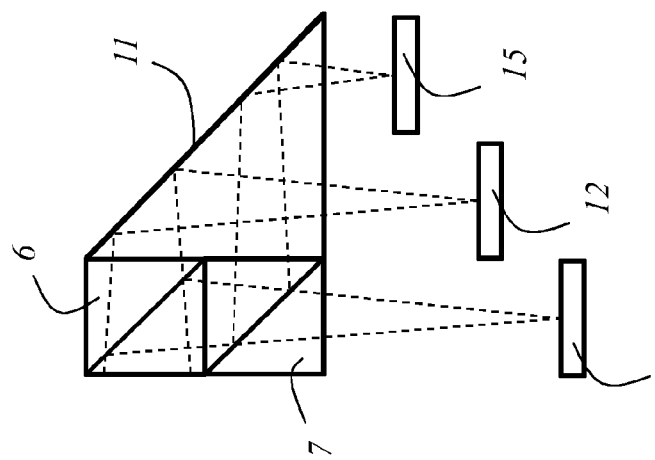

FIG. 12a shows an eighth embodiment, in which the three surface detector elements 10, 12, 15 can be displaced along their optical axis standing perpendicular in such a way that the three surface detector elements each lie in the optimal focus position. In this case, the three surface detector elements could either be fixedly anchored in the respective focus position or held movably in the sense that their position along the optical axis can be adjusted, for example, by a mechanical, pneumatic or electrical drive, or by a drive based on the piezoelectric effect, in order to reach a certain position on the optical axis. In the arrangement shown in FIG. 12b, the arrangement of FIG. 12a was expanded equivalent to the previous embodiments by three optical components 10, 12, 15, which are part of an adjusting device 9 for adjusting the optical path lengths of the detection beam path branches, in such a way that in front of each surface detector element an optical component is arranged for the purpose of fine adjustment of the focus position on the respectively associated surface detector element. This can be achieved according to embodiments of the invention in any of the ways previously described above, for example by using suitable glass blocks and/or by using an optical component 10, 12, 15 of variable thickness.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for analyzing a microscopic sample with a microscope, the method comprising:
  illuminating at least a sub-region of the microscopic sample by illumination light;
  guiding detection light emanating from the microscopic sample on a detection beam path, which includes at least one focusing optical element and which has a plurality of detection beam path branches, each with at least one detector element, the detector elements being parts of the same surface detector; and
  adjusting, by an adjusting element in at least a first one of the detection beam path branches, an optical path length of the first detection beam path branch in such a way that the portion of the detection light guided on the first detection beam path branch is focused on the detector element of the first detection beam path branch.

2. The method according to claim 1, wherein the detection light is distributed to different ones of the detection beam path branches as a function of at least one detection light property.

3. The method according to claim 2, wherein the at least one detection light property comprises a spatial orientation of a linear polarization and/or an association with a predetermined or predeterminable wavelength range.

4. The method according to claim 1, wherein the detection light is distributed to different ones of the detection beam path branches and/or is focused onto the detector elements of different detection beam path branches as a function of location of origin of the detection light and/or as a function of an axial distance of the location of the origin to a detection lens.

5. The method according to claim 4, wherein multiple sample layers are illuminated simultaneously or sequentially and the detection light is distributed to different ones of the detection beam path branches and/or is focused on detector elements of different detection beam path branches as a function of the sample layer from which the detection light originates.

6. The method according to claim 1, wherein the optical path lengths of the detection beam path branches onto the detector elements adjustable in that the surface detector elements are moveable along their optical axis.

7. The method according to claim 1, wherein:
  a. the detection beam path has at least one beam splitter,
  b. the detection beam path has at least one neutral beam splitter,
  c. the detection beam path has at least one polarization beam splitter, and/or
  d. the detection beam path has at least one color beam splitter.

8. The method according to claim 1, wherein:
  a. the optical path length of the first detection beam path branch and the optical path length of a second detection beam path branch are adjusted and/or are adjustable independently of one another,
  b. each detection beam path branch has its own adjusting element, with which its optical path length is adjusted and/or is adjustable,
  c. an adjusting element is present, with which the optical path lengths of at least two detection beam path branches are changed and/or are changeable simultaneously,
  d. the optical path length of the first detection beam path branch and the optical path length of a second detection beam path branch are different, and/or
  e. in each of the detection beam path branches, an adjusting element is present with which the optical path length of the respective detection beam path branch is adjusted in such a way that the portion of the detection light guided on the respective detection beam path branch is focused on the detector element of the respective detection beam path branch.

9. The method according to claim 1, wherein:
  a. the adjusting element has a plurality of different transparent optical components, which are insertable in exchange for one another into the detection beam path and/or into a detection beam path branch,
  b. the adjusting element has a plurality of transparent optical components, which are insertable independently of one another into the detection beam path and/or into a detection beam path branch,
  c. the adjusting element has a plurality of transparent optical components arranged on a turret or on a displacement arrangement,
  d. the adjusting element has at least one transparent block, which is arranged rotatably and/or displaceably in such a way that the portion of the block located in the detection beam path and/or in a detection beam path branch is variable, and/or
  e. the adjusting element has at least one transparent optical component, which is formed as a solid block.

10. The method according to claim 1, wherein:
  a. the adjusting element has at least one optical component that is adjustable in geometrical and/or optical thickness,
  b. the adjusting element has at least one optical component that is variable in its shape,
  c. the adjusting element has at least one vessel that is variable in shape and is filled with a fluid,
  d. the adjusting element has at least one adjustable optical component having two transparent limiting discs, the spacing of which is adjustable and between which a liquid optical medium is arranged, and/or
  e. the adjusting element has at least one adjustable optical component having two transparent limiting discs, the spacing of which is adjustable and between which a liquid optical medium is arranged, wherein a resilient film together with the limiting discs encloses a receiving space for the optical medium.

11. The method according to claim 1, wherein the object is illuminated by a sheet of light or a quasi light sheet and/or wherein the illuminated object region comprises multiple object layers spaced at a distance from one another.

12. The method according to claim 1, wherein:
a. the microscopic sample remains stationary during adjustment of the adjusting element,
b. the microscopic sample and a detection lens remain stationary during the adjustment of the adjusting element,
c. the microscopic sample, a detection lens and all the detector elements remain stationary during the adjustment of the adjusting element,
d. the geometrical path length of at least one detection beam path branch remains constant during the adjustment of the optical path length of at least one detection beam path branch, and/or
e. the geometrical path length of the detection beam path remains constant during the adjustment of the optical path lengths of the detection beam path branches.

13. The method according to claim 1, wherein the method is carried out using a scanning microscope, a confocal scanning microscope, a camera and/or a color camera.

14. The method according to claim 1, wherein:
a. a longitudinal chromatic aberration of a focusing optical element and/or a longitudinal chromatic aberration of an optical system upstream in the detection beam path is corrected by the adjusting element or by a plurality of adjusting elements, and/or
b. a longitudinal chromatic aberration of a focusing optical element and/or a longitudinal chromatic aberration of an optical system upstream in the detection beam path is corrected automatically by the adjusting element or by a plurality of adjusting elements.

15. A device configured to implement the method according to claim 1.

16. A device for optical analysis of an object with a microscope, the device comprising:
a branched detection beam path having a detection lens, at least one focusing optical element and a plurality of detection beam path branches each with at least one detector, the detectors being parts of the same surface detector; and
an adjuster present in at least a first one of the detection beam path branches with which an optical path length of the first detection beam path branch is adjustable in such a way that the portion of the detection light guided on the first detection beam path branch is focused on the detector of the first detection beam path branch.

17. The device according to claim 15, wherein the detection beam path is branched in such a way that the detection light is distributed to different ones of the detection beam path branches as a function of at least one detection light property.

18. The device according to claim 17, wherein the at least one detection light property comprises a spatial orientation of a linear polarization and/or an association with a predetermined or predeterminable wavelength range.

19. The device according to claim 15, wherein the detection beam path is branched in such a way that the detection light is distributed to different ones of the detection beam path branches and/or focused on the detectors of the different detection beam path branches as a function of location of origin of the detection light and/or as a function of the axial distance of a location of the origin to a detection lens.

20. The device according to claim 19, further comprising an illuminator configured to illuminate multiple sample layers, wherein the detection light is distributed to different ones of the detection beam path branches and/or focused on the detectors of the different detection beam path branches as a function of the sample layer from which the detection light originates.

21. The device according to claim 15, wherein:
a. the detection beam path has at least one beam splitter,
b. the detection beam path has at least one neutral beam splitter,
c. the detection beam path has at least one polarization beam splitter, and/or
d. the detection beam path has at least one color beam splitter.

22. The device according to claim 15, wherein:
a. the optical path length of the first detection beam path branch and the optical path length of a second detection beam path branch are adjustable independently of one another,
b. each detection beam path branch has its own adjuster, with which its optical path length can be adjusted,
c. an adjuster is present, with which the optical path lengths of at least two detection beam path branches are changeable simultaneously,
d. the optical path lengths of the first detection beam path branch and the optical path length of a second detection beam path branch are different, and/or
e. in each of the detection beam path branches an adjuster is present with which the optical path length of the respective detection beam path branch is adjustable in such a way that the portion of the detection light guided on the respective detection beam path branch is focused on the detectors of the respective detection beam path branch.

23. The device according to claim 15, wherein:
a. the adjuster has a plurality of different transparent optical components, which are insertable in exchange for one another into the detection beam path and/or into a detection beam path branch,
b. the adjuster has a plurality of transparent optical components, which are insertable independently of one another into the detection beam path and/or into a detection beam path branch,
c. the adjuster has a plurality of transparent optical components arranged on a turret or on a displacement arrangement,
d. the adjuster has at least one transparent block, which is arranged rotatably and/or displaceably in such a way that the portion of the block located in the detection beam path and/or in a detection beam path branch is variable,
e. the adjuster has at least one transparent optical component, which is formed as a solid block, and/or
f. the adjuster has at least one transparent optical component with at two interfaces curved in the same direction and/or with the same radius of curvature.

24. The device according to claim 15, wherein:
a. the adjuster has at least one optical component that is adjustable in geometrical and/or optical thickness,
b. the adjuster has at least one optical component that is variable in shape,
c. the adjuster has at least one vessel that is variable in shape and is filled with a fluid,
d. the adjuster has at least one adjustable optical component having two transparent limiting discs, the spacing of which is adjustable and between which a liquid optical medium is arranged,
e. the adjuster has at least one adjustable optical component having two transparent limiting discs, curved in particular in the same direction and/or with the same radius of curvature, the spacing of which is adjustable and between which a liquid optical medium is arranged, and/or f. the adjuster has at least one adjustable optical component having two transparent limiting discs, the spacing of which is adjustable and between which a liquid optical medium is arranged, wherein a resilient film together with the limiting discs encloses a receiving space for the optical medium.

25. The device according to claim 15, further comprising an illuminator which has a sheet of light or a quasi light sheet for illuminating the object and/or multiple object layers of the object.

26. The device according to claim 15, further comprising a controller configured to automatically correct a longitudinal chromatic aberration of the focusing optical element and/or a longitudinal chromatic aberration of an optical system upstream in the detection beam path using the adjuster or a plurality of adjusters.

27. The device according to claim 15, wherein:
a. the device includes a microscope, a scanning microscope and/or a confocal scanning microscope, and/or is formed from a microscope, a scanning microscope and/or a confocal scanning microscope, and/or
b. the device is formed as a camera and/or as a color camera.

* * * * *